United States Patent
De Praeter et al.

(10) Patent No.: US 11,356,683 B2
(45) Date of Patent: Jun. 7, 2022

(54) CREATING DIFFERENT VIDEO STREAM REPRESENTATIONS

(71) Applicants: UNIVERSITEIT GENT, Ghent (BE); IMEC VZW, Leuven (BE)

(72) Inventors: Johan De Praeter, Ghent (BE); Glenn Van Wallendael, Gentbrugge (BE); Peter Lambert, Torhout (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 17/044,567

(22) PCT Filed: Apr. 2, 2019

(86) PCT No.: PCT/EP2019/058315
§ 371 (c)(1),
(2) Date: Oct. 1, 2020

(87) PCT Pub. No.: WO2019/193012
PCT Pub. Date: Oct. 10, 2019

(65) Prior Publication Data
US 2021/0099723 A1 Apr. 1, 2021

(30) Foreign Application Priority Data
Apr. 3, 2018 (EP) .................... 18165568

(51) Int. Cl.
*H04N 19/40* (2014.01)
*H04N 19/172* (2014.01)
(Continued)

(52) U.S. Cl.
CPC .......... *H04N 19/40* (2014.11); *H04L 65/601* (2013.01); *H04L 65/607* (2013.01);
(Continued)

(58) Field of Classification Search
CPC .... H04N 19/40; H04N 19/172; H04N 19/188; H04N 21/2343; H04N 21/236; H04L 65/601; H04L 65/607
See application file for complete search history.

(56) References Cited

U.S. PATENT DOCUMENTS

| | | | |
|---|---|---|---|
| 6,483,543 B1 * | 11/2002 | Zhang | H04N 21/234309 348/390.1 |
| 2002/0126752 A1 * | 9/2002 | Kim | H04N 19/40 375/240.03 |
| 2007/0230568 A1 * | 10/2007 | Eleftheriadis | H04N 19/48 375/240.1 |

(Continued)

FOREIGN PATENT DOCUMENTS

| | | |
|---|---|---|
| WO | 2011153194 A1 | 12/2011 |
| WO | 2015053697 A1 | 4/2015 |

(Continued)

OTHER PUBLICATIONS

De Praeter et al., "Video Encoder Architecture for Low-Delay Live-Streaming Events," IEEE Transactions on Multimedia, vol. 19, No. 10, Oct. 31, 2017, pp. 2252-2266.
Extended European Search Report from corresponding EP Application No. 18165568.9, dated Aug. 13, 2018.
(Continued)

*Primary Examiner* — Mohammed S Rahaman
(74) *Attorney, Agent, or Firm* — Workman Nydegger (57) ABSTRACT

A transcoder for transcoding a basic representation of a videostream into one or more arbitrary representations comprises: a receiver adapted for receiving the basic representation and at least one frame information set comprising one or more frame information packets; a decoder adapted for decoding the basic representation; a re-encoder adapted for selecting at least one frame information set and for selecting one or more frame information packets from this at least one
(Continued)

frame information set for forming a arbitrary representation, the re-encoder is adapted for extracting coding information from the frame information packets, and for re-encoding the decoded basic representation using the coding information thereby obtaining the one or more arbitrary representations.

12 Claims, 3 Drawing Sheets

(51) Int. Cl.
    *H04N 19/169*    (2014.01)
    *H04L 65/60*    (2022.01)
    *H04N 21/2343*    (2011.01)
    *H04N 21/236*    (2011.01)

(52) U.S. Cl.
    CPC ......... *H04N 19/172* (2014.11); *H04N 19/188* (2014.11); *H04N 21/236* (2013.01); *H04N 21/2343* (2013.01)

(56) References Cited

U.S. PATENT DOCUMENTS

| | | | |
|---|---|---|---|
| 2012/0179833 A1* | 7/2012 | Kenrick | H04N 19/61 709/231 |
| 2013/0293787 A1* | 11/2013 | Van Wallendael | H04N 21/4384 348/731 |
| 2019/0014334 A1* | 1/2019 | Samuelsson | H04N 19/48 |

FOREIGN PATENT DOCUMENTS

| | | | | |
|---|---|---|---|---|
| WO | WO 2015053697 | * | 4/2015 | H04N 19/40 |
| WO | 2017176180 A1 | | 10/2017 | |

OTHER PUBLICATIONS

International Search Report and Written Opinion from corresponding PCT Application No. PCT/EP2019/058315, dated May 29, 2019.

* cited by examiner

CREATING DIFFERENT VIDEO STREAM REPRESENTATIONS

FIELD OF THE INVENTION

The invention relates to the field of video delivery systems. More specifically it relates to video delivery systems which offer the flexibility to switch between different representations of a video.

BACKGROUND OF THE INVENTION

Video delivery systems are designed to transmit video data from a source side to a destination side over a communication network. The source side is typically deployed in a datacenter. At the source side content is prepared for being transmitted to the client and is typically compressed for transmitting it over the communication network. At the destination side the video stream may for example be received on a laptop, computer, or smartphone.

Figure 1:
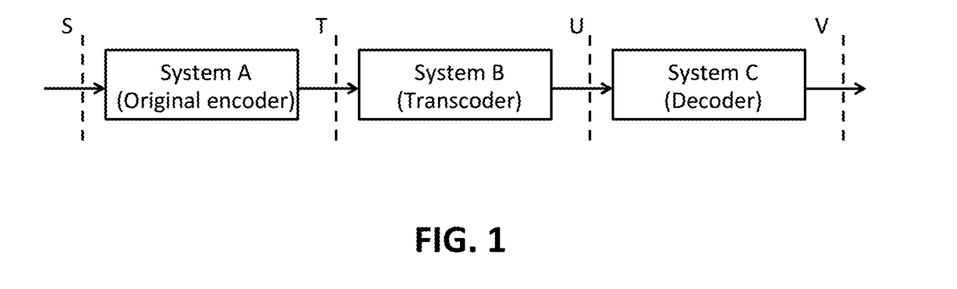
FIG. 1 shows a basic architecture of a video delivery system.

Depending on the underlying communication network and depending on the content requirements the representation of the video may differ from user to user. To cope with these flexibility requirements different video delivery systems have been proposed. All these video delivery systems have a similar basic architecture which is schematically represented in FIG. 1. This basic architecture comprises a system A which is adapted for encoding one or more incoming video's. This system A may for example be deployed in a datacenter.

In video delivery systems the data may be further processed at an intermediate stage. In the basic architecture illustrated in FIG. 1 this is represented by system B. In this system the data is transcoded and transmitted to the client. Depending on the video delivery system design, system B may be located closer to the datacenter or closer to the client or event at the client's premises.

Typically, in system A the processing power is significantly higher than in system B and system C because system A is located at the datacenter side. System C may for example be a device at the client's premises or it may be a battery powered system such as a smartphone. System B is an intermediate system of which the processing power may for example be limited compared to system A, and higher than system C.

The interfaces S, T, U, and V are representing data formats at different positions in the video delivery system. Depending on the position different constraints may be imposed on the data stream. The further in the chain the more reduced the bandwidth of the underlying network may be. The data over interface T may for example be transmitted over a backbone network, whereas the data over interface U may be transmitted over a communication network with a smaller bandwidth.

Figure 2:
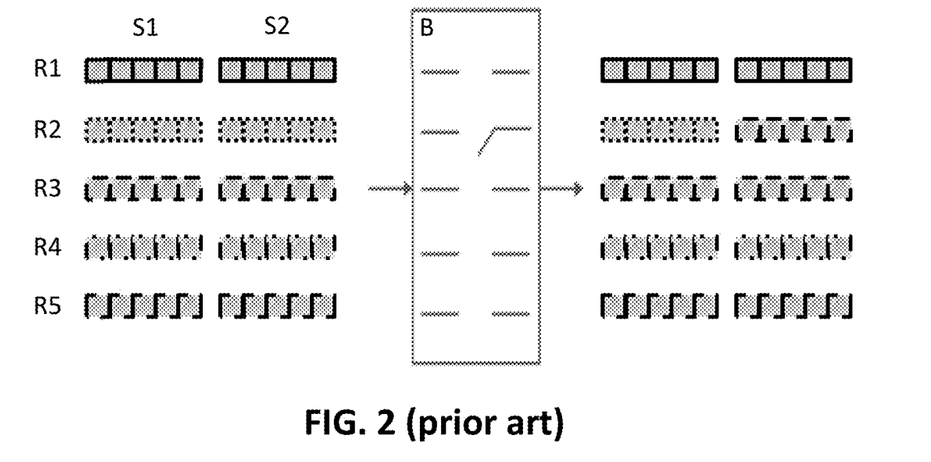
FIG. 2 shows a schematic drawing of a prior art simulcast video delivery system.
Figure 3:
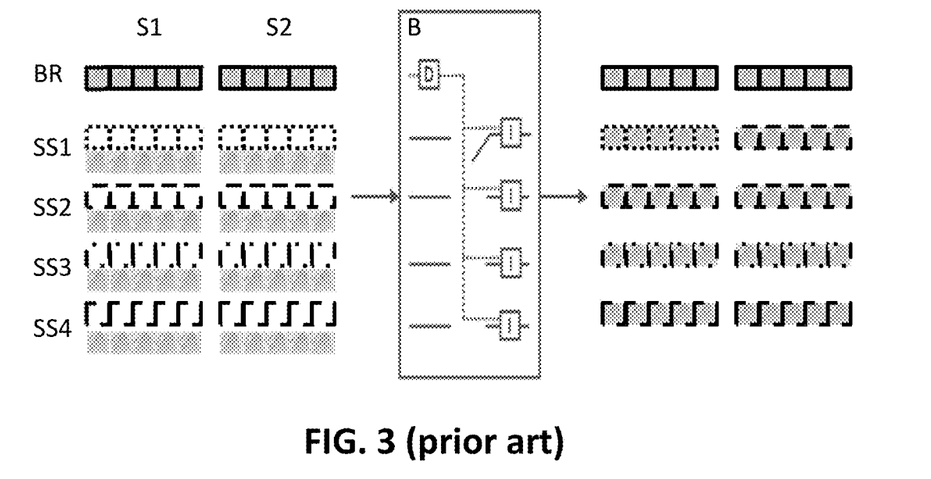
FIG. 3 shows a schematic drawing of a prior art deflation/inflation-based video delivery system.
Figure 4:
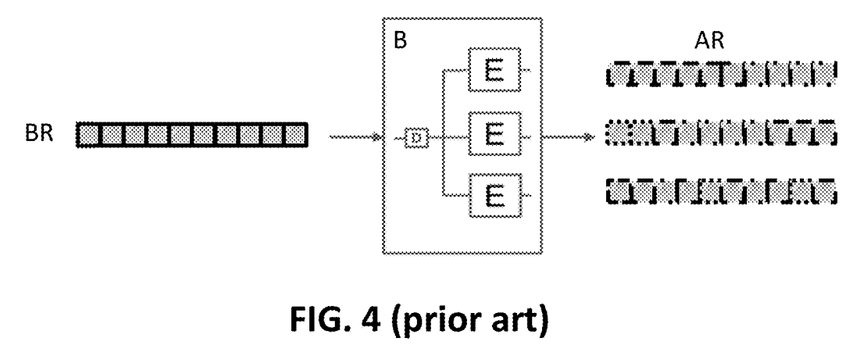
FIG. 4 shows a schematic drawing of a prior art video delivery system wherein the transcoder comprises a decoder and a plurality of full encoders.

FIGS. 2 to 4 show schematic drawings of prior art video delivery systems. The left side of the figures shows the data at interface T, the middle part shows the transcoders (system B) and the right side shows the data at interface U. The data at interface T is the output of the encoder. The encoder processes incoming video to compress the video resulting in coding decisions and residu's. Each image comprises a set of decisions of the encoder and a set of residu's. In the FIGS. 2 to 4 each square is representative for an image. The inner part of each square represents a residu and the edge of the square represents the coding decisions.

The most-widely used solution to provide some form of flexibility without introducing extra encoding complexity is a simulcast solution. In this solution, a video provider (system A) encodes a video with a limited set of different representations (R1, R2, . . . ). These representations can have different properties such as high/low bit rate, high/low resolution, high/low number of frames per second. The data is represented by squares which are grouped in segments. The representations at the T interface are divided in segments (S1, S2). Switching between different representations is possible at the start of a new segment in the video. These segments each have a length typically between two and ten seconds. The edges of the squares are shown in different line formats and represent different coding decisions for each of the representations. Also, the residu's will be different for the different representations (although the residu's are different between the different images, in the schematic drawings, for ease of representation, the inner part of the squares has always the same shape). In the case of simulcast, System A thus provides multiple representations of the video, divided in segments which contain both coding decisions and residual information for several seconds of subsequent frames. System B is then a simple select that determines which segment should be sent to the client. This is illustrated in FIG. 2.

FIG. 3 shows a schematic drawing of a prior art video delivery system in which the decoder executes deflation (D) and inflation (I) of the video stream as proposed by Ericsson [J. Samuelsson, R. Sjöberg, T. Rusert, and K. Andersson. (2017). Methods, Encoder, and Transcoder for Transcoding. WO 2017/176180]. This involves transmitting sidestreams in the form of coding decisions together with residual differences over interface T. As a result, the required bandwidth on interface T is lower compared to simulcast. FIG. 3 shows different sidestreams (SS1, . . . SS4) wherein each of the sidestreams comprises coding decisions represented by the square edges and residual differences represented by the filled squares.

Essentially, this method is very similar to simulcast, except that System A creates a basic representation and sidestreams instead of multiple representations (deflation). The basic representation is a normal video bitstream (e.g. like representation 1 in the simulcast case), consisting of coding decisions and residual information. The sidestreams, however, consist of coding decisions and a residual difference. In System B, the basic representation is decoded in Block D. In the inflation step in Block I, the coding decisions of a sidestream are applied to calculate a new residual by using the decoded output of Block D. This residual is enhanced with the residual difference to reproduce the same representations as in the case of simulcast.

FIG. 4 shows a schematic drawing of a prior art video delivery system wherein the transcoder comprises a decoder and a plurality of full encoders. FIG. 4 also shows the input and output of System B. This video delivery system offers full flexibility at the cost of full decoding and re-encoding. The transcoder must fully decode an incoming video stream, before inserting different partial content and/or applying different technical characteristics. Then, the video is fully re-encoded again. In this method, System A only needs to generate one basic representation (BR). In System B, this representation is decoded (Block D), and then re-encoded (Block E) into arbitrary representations as required. Although full flexibility is achieved, the computational cost prevents it from being used in case of many users.

Another prior art video delivery system is described by Johan De Praeter, Glenn Van Wallendael, Jurgen Slowack, and Peter Lambert in the paper "a Video Encoder Architecture for Low-Delay Live-Streaming Events", IEEE TRANS- ACTIONS ON MULTIMEDIA, VOL. 19, NO. 10, October 2017. This paper proposes a fast-encoder architecture based on coding information calculation (CIC) modules and residual encoder (RE) modules. The CIC modules calculate coding information for the video at certain bit rates whereas the RE modules use this information to skip all encoding steps of a traditional encoder, except for the encoding of the residual. By reducing the amount of bits used to encode the residual, the RE modules can then provide bitstreams with personalized bit rates for several users at the same time. Only different bit rate representations are considered by varying the quantization parameter. The residual encoders and information calculation modules are assumed to be located in the same point in the network (all in System A).

In view of the flexibility requirements for generating video streams with different partial content and/or with different representations there is still room for improvement in video delivery systems.

SUMMARY OF THE INVENTION

It is an object of embodiments of the present invention to provide video delivery systems, encoders, and transcoders and methods which offer flexible switching between different representations wherein the transcoders are less computationally complex than a full encoder.

The above objective is accomplished by a method and device according to the present invention.

In a first aspect, embodiments of the present invention relate to a transcoder for transcoding a videostream (which is formatted in a basic representation) into one or more arbitrary representations, throughout the description also referred to as desired representations. The transcoder comprises a receiver adapted for receiving the basic representation and for receiving at least one frame information set which comprises one or more frame information packets. The transcoder moreover comprises a decoder adapted for decoding the basic representation resulting in a decoded basic representation. The transcoder moreover comprises a re-encoder adapted for selecting at least one frame information set and for selecting one or more frame information packets from this at least one frame information set for forming a desired representation. The re-encoder is adapted for extracting coding information from the frame information packets, and for re-encoding the decoded basic representation using the coding information thereby obtaining the one or more desired representations on a frame per frame basis. In other words, the re-encoder is adapted for generating an arbitrary representation (AR) by choosing appropriate frame information packets from the provided frame information sets and applying their coding decisions when re-encoding the basic representation. In embodiments of the present invention it is this encoder that calculates the appropriate residue for the arbitrary representation.

It is an advantage that a transcoder according to embodiments of the present invention comprises a re-encoder which is adapted to process the frame information packets to extract coding information. The re-encoder is adapted for using this coding information when re-encoding the adapted presentation. Hence, all operations which would normally be required in an encoding process and which are related to making coding decisions are not required in a re-encoder according to embodiments of the present invention. Since all coding decisions are provided by the frame information packets, the re-encoding process according to embodiments of the present invention has a similar low complexity as a decoder.

In embodiments of the present invention the coding decisions are used for creating video representations within a certain range of parameters.

It is an advantage of embodiments of the present invention that desired presentations with different technical characteristics can be created.

In embodiments of the present invention the number of frame information sets may vary depending on the supported configurations (i.e. the representations that can be generated by the transcoder).

The re-encoder may be adapted to select a frame information set from a plurality of frame information sets each supporting a different spatial resolution and for extracting coding information from the selected frame information set and for re-encoding the decoded basic presentation to obtain a desired presentation with the desired spatial resolution.

The re-encoder of a transcoder in accordance with embodiments of the present invention may be adapted to select a frame information set, and use it for the re-encoding to obtain a desired presentation (e.g. according to a specific compression standard, according to a bit rate range)

In embodiments of the present invention the re-encoder is adapted for extracting coding decisions, and/or header information, and/or metadata from the frame information packets.

In embodiments of the present invention the transcoder is adapted for modifying the decoded basic representation before re-encoding it.

It is an advantage of embodiments of the present invention that video streams with different partial content can be generated. This is achieved by a transcoder which is adapted for modifying the decoded basic representation before re-encoding it.

In embodiments of the present invention the transcoder is adapted for modifying the desired representation in function of user requests.

It is an advantage of embodiments of the present invention that the generated representation can be tailored on the user's needs (e.g. the set-up of the user) and on the bandwidth of the underlying communication network.

It is an advantage of embodiments of the present invention that low latency error recovery is possible because the transcoder can re-encode the decoded basic presentation into the desired presentation upon user request when a user detects a transmission error.

In a second aspect, embodiments of the present invention relate to an encoder adapted for receiving an incoming video and for generating a videostream which comprises a basic representation and at least one frame information set comprising one or more of frame information packets wherein the frame information packets comprise coding information.

In embodiments of the present invention the encoder is adapted for generating one or more frame information packets which comprise coding decisions, and/or header information, and/or metadata.

In a third aspect, embodiments of the present invention relate to a video delivery system comprising at least one encoder and at least one transcoder according to embodiments of the present invention. The at least one encoder is connected with the at least one transcoder such that a videostream formatted in a basic representation and at least one information set generated by the encoder can be received by the receiver of the transcoder.

In embodiments of the present invention the video delivery system moreover comprises at least one user receiver wherein at least one of the transcoders is directly or indirectly connected with the at least one user receiver, such that a desired presentation completely or partly generated by the transcoder can be received by the user receiver.

Because of the reduced complexity of a transcoder in accordance with embodiments of the present invention the number of transcoders which are deployed is less critical than in case a full decoder/encoder would be implemented. As a result, a transcoder can be positioned anywhere in the video delivery system. This means that a transcoder in accordance with embodiments of the present invention can, for example, be deployed not only next to an encoder, but also at the edge nodes, or even at a base station in the client's home.

In a fourth aspect, embodiments of the present invention relate to a method for transcoding a videostream (which is formatted in a basic representation) into one or more desired representations. The method comprises:

receiving the basic representation and receiving at least one frame information set comprising one or more frame information packets, decoding the basic representation resulting in a decoded basic representation, selecting at least one frame information set and selecting one or more frame information packets from this at least one frame information set for forming a desired representation, extracting coding information from the frame information packets, and re-encoding the decoded basic representation using the coding information thereby obtaining the one or more desired representation.

The method may comprise extracting coding decisions, and/or header information, and/or metadata from the frame information packets.

The method may comprise modifying the decoded basic representation before re-encoding it.

The method may comprise modifying the desired representation in function of user requests.

The method may comprise generating the basic representation and the at least one frame information set comprising one or more frame information packets from an incoming video.

The method may comprise generating one or more frame information packets which comprise coding decisions, and/or header information, and/or metadata.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, embodiments of the present invention relate to a transcoder 110 for transcoding an incoming videostream into one or more desired representations. The incoming videostream is formatted in a basic representation.

The transcoder comprises a receiver 112 adapted for receiving the basic representation and for receiving at least one frame information set comprising one or more frame information packets.

The transcoder also comprises a decoder 114 adapted for decoding the basic representation resulting in a decoded basic representation.

The transcoder also comprises a re-encoder 116 adapted for selecting at least one frame information set and for selecting one or more frame information packets from this at least one frame information set, for forming a desired representation. A frame information set may comprise one or more frame information packets. Coding info, header information and metadata may be combined in one frame information packet or may be transmitted in different frame information packets.

The re-encoder is adapted for extracting coding information from the frame information packets, and for re-encoding the decoded basic representation using the coding information thereby obtaining the one or more desired representation. In embodiments of the present invention the re-encoder only uses information from the at least one frame information set for re-encoding the decoded basic representation.

Figure 5:
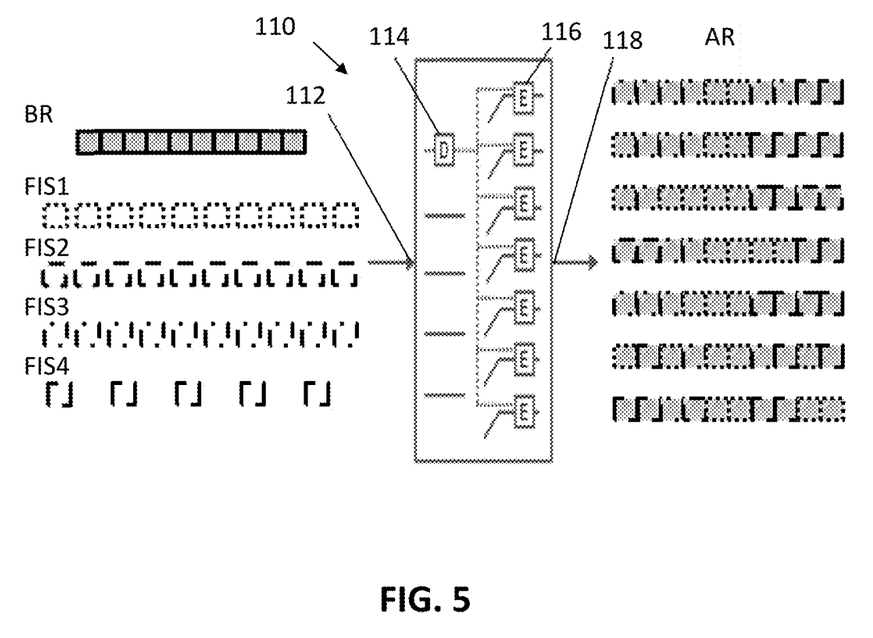
FIG. 5 shows a schematic drawing of a video delivery system comprising a transcoder according to embodiments of the present invention.

An overview of the invention is shown in FIG. 5. The key elements that make the invention work, are the use of frame information sets (FIS1, FIS2, . . . ) and the logic in System B. The incoming data arrives at the receiver 112 and is decoded by the decoder 114. The re-encoder 116 of system B is adapted for generating an arbitrary representation (AR) by choosing appropriate frame information packets from the provided frame information sets and applying their coding decisions when re-encoding the basic representation. This arbitrary representation is transmitted by transmitter 118.

The re-encoder 116 of transcoder 110 may therefore be adapted for executing the following steps:
1) selecting appropriate frame information packets from the received sets of frame information,
2) optionally, adapting the decoded basic representation and,
3) re-encoding the adapted video stream using the coding information extracted from the selected frame information packets.

In embodiments of the present invention the re-encoder 116 in system B can process the metadata from the frame information packets and skip all operations related to making coding decisions by using the coding decisions obtained from these packets. Since all coding decisions are provided by the frame information packets, the re-encoding process has a similar low complexity as a decoder.

The number of frame information sets may vary depending on the supported configurations. There may be frame information sets to support different coding structures, video compression standards, bit rate ranges, etc.

It is an advantage of embodiments of the present invention that the transcoder 110 (system B) can be positioned anywhere in the network. This means that the transcoder can, for example, be deployed next to System A, at the edge nodes, or even at a base station in the client's home.

It is an advantage of embodiments of the present invention that video streams (the desired representations) with different partial content (viewport extraction, logo insertion, banner insertion, compositions, video watermarking, . . . ) and different technical characteristics (coding structure including picture type (I, P, B) and reference structure, bitrate, frame rate, spatial resolution, bit depth, color gamut, chroma format, video codecs, decoding complexity, parallelization properties of the video stream, . . . ) can be generated, originating from the same source video (the basic representation). Depending on the client requirements and on the communication network requirements different representations of the video stream may be desirable.

In embodiments of the present invention the re-encoder is adapted for modifying frames in the reference buffer and/or for selecting a representation which depends on existing frames in the reference buffer. This is further explained in the examples below. In general, the reference buffer is a typical part of an encoder in which the reference pictures are stored. These reference pictures are the pictures that are used for motion estimation in inter-picture prediction.

In a prior art encoder, the necessary pictures are available in the reference buffer, and they have the correct properties. However, for a transcoder comprising a re-encoder in accordance with embodiments of the present invention, the following can occur:

When switching from a first spatial resolution (e.g. 1280×720 pixels) to a second spatial resolution (e.g. 1920×1080 pixels), the motion vector coding information might point at a region in a previous picture with coordinates (e.g. (1336, 904)) which do not exist if the previous picture in the reference buffer still has the first spatial resolution. To solve this, the re-encoder can upscale the pictures in the reference buffer from the first spatial resolution to the second spatial resolution.

When switching to a representation which has inter-coded frames that depend on some previous frames, the representation should depend only on existing frames in the reference buffer. For example, frame 8 requires the presence of frames 4 to 7 in the reference buffer. However, due to a packet loss that occurred earlier, frames 5 and 6 are not available. Hence, it is not possible to use this representation. However, it is possible to switch to representations that only require the presence of frame 4 and/or 7, or a representation that uses intra-prediction (and does not require any other frames in the buffer).

In embodiments of the present invention the re-encoder 116 may be adapted for recalculating part of the coding decisions instead of skipping all operations related to making coding decisions. This is only possible if processing power allows this. This way desired representations with specific technical characteristics may be obtained which are not completely covered by the frame information packets which are generated by the encoder 120 and received by the transcoder 110.

In a second aspect, embodiments of the present invention relate to an encoder 120 adapted for receiving an incoming video and for generating a videostream which comprises a basic representation and at least one frame information set comprising one or more information packets wherein the frame information packets comprise coding information.

The encoder 120 may comprise different functional components such as for example a component for extracting the basic information, a component for generating the frame information packets. The component for generating the frame information packets may itself be subdivided in a component for generating the coding decisions, a component for generating the header information, a component for generating the metadata. These components may be implemented centrally or distributed.

In embodiments of the encoder 120 is adapted for generating a set of frame information packets for every parameter of the desired representations, like coding and reference structure, spatial resolution, and different video codecs.

An encoder 120 according to embodiments of the present invention is adapted for receiving an incoming video and for generating a basic representation and at least one frame information set. This at least one frame information set comprises frame information packets. These packets may contain the following data:

Coding decisions (i.e. coding information; coding decisions and coding information are used interchangeably and have the same meaning) valid for creating video representations within a certain range of parameters (e.g. for a certain bit rate range, certain bit depths, certain chroma formats, and a certain range of color gamuts).

Header information that describes the content of the frame information packet, such as the spatial resolution and coding structure, as well as the parameter ranges for which the coding decisions can be used.

Metadata that indicates the dependencies of a frame information packet. For example, a packet containing decisions for an inter-coded frame should only be used if all reference frames are available. This might not be the case if a switch between different frame rates or packet loss occurred recently.

Other metadata that contains further requirements/instructions for the use of the packet. For example, switching between different spatial resolutions may require the frames in the reference buffer of the encoder to be rescaled. This metadata can signal such instructions to the re-encoder 116 in System B. In embodiments of the present invention the re-encoder is adapted for using this metadata for obtaining the desired presentation.

In embodiments of the present invention a frame information set may comprise coding information for at least one intra-coded frame.

In a third aspect, embodiments of the present invention relate to a video delivery system 100 comprising at least one encoder 120 according to embodiments of the present invention, and at least one transcoder 110 according to embodiments of the present invention. The encoder 120 is connected with the at least one transcoder 110 such that a videostream and at least one information set generated by the encoder 120 can be received by the receiver 112 of the transcoder.

In embodiments of the present invention at least one of the transcoders 110 is directly or indirectly connected with at least one user receiver 130, such that a desired representation completely or partly generated by the transcoder can be received by the user receiver 130.

In embodiments of the present invention an additional module may be present between the transcoder 110 and the receiver 130. The transcoder 110 may for example generate a certain representation, but the additional module may modify this afterwards to deliver the modified representation to a receiver. The additional module may for example be a tile-based bitstream compositor that merges several bitstreams into a tiled video composition.

Figure 6:
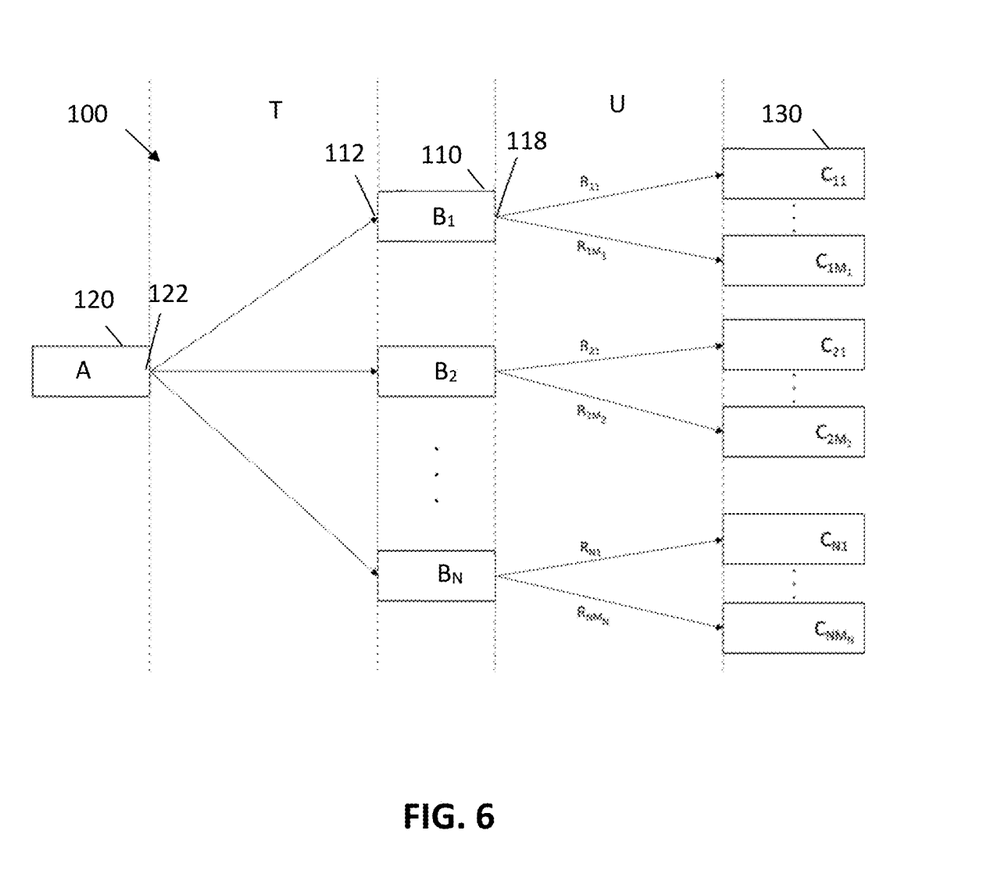
FIG. 6 shows a schematic drawing of a video delivery system in accordance with embodiments of the present invention.

An example of such a video delivery system 100 according to embodiments of the present invention is illustrated in FIG. 6. It shows an encoder 120 (also shown as A) connected with a transcoder 110 (in this example a plurality of transcoders $B_1$, $B_2$, $B_3$). The data at interface T comprises a basic representation and at least one frame information set which comprises at least one frame information packet). In this example each of the transcoders 110 is connected with at least one user receiver 130 (in this example transcoder $B_1$ is connected with user receivers $C_{11}$ to $C_{1M1}$ with representations $R_{11}$ to $R_{1M1}$ at interface U, transcoder $B_2$ is connected with user receivers $C_{21}$ to $C_{2M2}$ with representations $R_{21}$ to $R_{2M2}$ at interface U, transcoder $B_N$ is connected with user receivers $C_{N1}$ to $C_{NMN}$ with representations $R_{N1}$ to $R_{NMN}$ at interface U).

As can be seen from this example a plurality of representations can be offered to a plurality of end users. It is moreover advantageous that low latency communication with many users is possible.

Video delivery systems according to embodiments of the present invention may for example be deployed for video-conferencing.

In embodiments of the present invention video fingerprinting is implemented by the transcoder which is adapted for inserting a watermark in the decoded basic representation before re-encoding one of the desired representations.

Similarly, content such as logos, banners and advertisements may be inserted in the decoded basic representation.

Video delivery systems according to embodiments of the present invention may also be used for interactive video (e.g. for live-delivery of views out of a 360-degree video to head-mounted displays).

In a fourth, aspect embodiments of the present invention relate to a method for transcoding a videostream, which is formatted in a basic representation. The method comprises the following steps:

receiving the basic representation and receiving at least one frame information set comprising one or more frame information packets, decoding the basic representation resulting in a decoded basic representation, selecting at least one frame information set and selecting one or more frame information packets from this at least one frame information set for forming a desired representation, extracting coding information from the frame information packets, and re-encoding the decoded basic representation using the coding information thereby obtaining the one or more desired representation.

In the following paragraphs a transcoding method according to embodiments of the present invention is compared with prior art video delivery methods. Whereas Simulcast provides a predefined, fixed set of different representations, a transcoding method according to embodiments of the present invention allows an increased flexibility of encoding parameters. Since the frame information packets in the present invention contain information on a frame level instead of segment level as in the state-of-the-art, a video delivery system according to the present invention has a much higher flexibility and response time.

Furthermore, on interface T, methods according to embodiments of the present invention require a reduced bandwidth compared to Simulcast, because in the present invention only the basic representation and the at least one frame information set needs to be transmitted over interface T.

Compared to Ericsson's deflation and inflation transcoders, a transcoder according to embodiments of the present invention allows an increased flexibility with respect to the variety of representations which can be generated. Also, the required bandwidth on interface T is reduced compared to the required bandwidth for Ericsson's deflation and inflation transcoders.

The traditional way of generating video streams with different partial content and different technical characteristics requires a computationally complex re-encoding step. Since a transcoding method according to embodiments of the present invention does not require this step, it has the advantage that it can be deployed on a larger scale with many users.

In prior art fast encoding methods described above, all video encoding happens at the system A. In contrast, in embodiments of the preset invention the transcoding of the video can take place anywhere in the network, even at the edge nodes close to the user at home, which makes the present invention a perfect fit for applications that must respond to user input (such as interactive video). Moreover, the present invention allows much more flexibility between different encoding parameters.

In the following table, a video delivery system according to the present invention is compared to the first three prior art video delivery systems (simulcast, deflation/inflation, prior art transcoding comprising a full encoding step). As seen in this table, a method according to embodiments of the present invention provides the flexibility and low latency of transcoding, without the high computational cost in System B. Instead, this cost can be offloaded to powerful cloud servers (System A). The plus sign indicates that a technique is better in that aspect, whereas the minus sign indicates the opposite.

|  | Server processing (System A) | Backbone bandwidth (Interface T) | Edge processing (System B) | Access link (Interface U) Flexibility Response time |
|---|---|---|---|---|
| Simulcast | − | − − | +++ | − − |
| Deflation/Inflation | − | − | + | − − |
| Transcoding | ++ | +++ | − − − | ++ |
| Present invention | − | + | + | ++ |

In summary, embodiments of the present invention, enable dynamic switching between different desired representations. Embodiments of the present invention may, moreover, enable personalized streaming.

In embodiments of the present invention system A and system B can be located at different points in the network.

A system according to embodiments of the present invention can quickly adapt to a client because the encoder can be employed close to the client premises e.g. right before the last mile, at the edge of the cloud.

Several sub-problems are solved by transcoders, encoders, video delivery systems, and methods according to embodiments of the present invention:

Improvement of error recovery: by using the invention, the latency introduced by error recovery is smaller than in prior art video communication systems.

Improvement of quality: by using the invention, each user can receive a bitstream that is tailored to his needs compared to prior art video streaming system where a more limited amount of bitstream representations are offered to users (or full decoding/encoding would be required).

Improved functionality: the invention enables the tuning of encoding parameters for each individual bitstream. Hence, situations like the following scenario become a possibility: a user is watching video on a mobile device. When the battery starts running low, the device can signal this to the video provider, who then modifies the encoding parameters to minimize the decoding complexity of the video, thus allowing the battery to last longer. Another example includes optimizing the bitstream parameters based on the number of cores currently available in a decoding device.

Enabling personalization: the invention enables the personalization of content. For example, at an edge node in the network, personalized advertisements can be embedded in the video. Also, these embedded advertisements cannot be blocked with an adblocker as is the case with Youtube now, since with the invention, the advertisement effectively becomes part of the video data. In a similar way, it's also possible to insert (invisible) personalized watermarks.

The invention claimed is:

1. A transcoder for transcoding a videostream, which is formatted in a basic representation, into one or more arbitrary representations,
the transcoder comprising:
a receiver adapted for receiving the basic representation and for receiving at least one frame information set comprising one or more frame information packets,
a decoder adapted for decoding the basic representation resulting in a decoded basic representation,
a re-encoder adapted for selecting at least one frame information set and for selecting one or more frame information packets from this at least one frame information set for forming an arbitrary representation on a frame per frame basis, the re-encoder is adapted for extracting coding information from the selected frame information packets, and for re-encoding the decoded basic representation using the coding information thereby obtaining the one or more arbitrary representations,
wherein the re-encoder is adapted for extracting all coding decisions from the frame information packets.

2. The transcoder according to claim 1, wherein the re-encoder is adapted for extracting header information and/or metadata from the frame information packets.

3. The transcoder according to claim 1 wherein the transcoder is adapted for modifying the decoded basic representation before re-encoding it.

4. The transcoder according to claim 1 adapted for modifying the arbitrary representation in function of user requests.

5. The video delivery system comprising at least one encoder adapted for receiving an incoming video and for generating a videostream which comprises a basic representation and at least one frame information set comprising one or more frame information packets wherein the frame information packets comprise coding information, and at least one transcoder according to claim 1 wherein the at least one encoder is connected with the at least one transcoder such that a videostream formatted in a basic representation and at least one information set generated by the encoder can be received by the receiver of the transcoder.

6. The video delivery system according to claim 5, the video delivery system moreover comprising at least one user receiver wherein at least one of the transcoders is directly or indirectly connected with the at least one user receiver, such that an arbitrary presentation completely or partly generated by the transcoder can be received by the user receiver.

7. A method for transcoding a videostream, which is formatted in a basic representation, into one or more arbitrary representations, the method comprising:
receiving the basic representation and receiving at least one frame information set comprising one or more frame information packets,
decoding the basic representation resulting in a decoded basic representation,
selecting at least one frame information set and selecting one or more frame information packets from this at least one frame information set for forming an arbitrary representation on a frame per frame basis,
extracting coding information from the selected frame information packets,
re-encoding the decoded basic representation using the coding information thereby obtaining the one or more arbitrary representations, and
extracting all coding decisions from the frame information packets.

8. The method according to claim 7, the method comprising extracting header information and/or metadata from the frame information packets.

9. The method according to claim 7, the method comprising modifying the decoded basic representation before re-encoding it.

10. The method according to claim 7, the method comprising modifying the arbitrary representation in function of user requests.

11. The method according to claim 7, the method comprising generating the basic representation and the at least one frame information set comprising one or more frame information packets from an incoming video.

12. The method according to claim 11, the method comprising generating one or more frame information packets which comprise coding decisions, and/or header information, and/or metadata.

* * * * *